(12) United States Patent
Apte et al.

(10) Patent No.: US 11,276,648 B2
(45) Date of Patent: Mar. 15, 2022

(54) PROTECTING CHIPS FROM ELECTROMAGNETIC PULSE ATTACKS USING AN ANTENNA

(71) Applicant: Nvidia Corporation, Santa Clara, CA (US)

(72) Inventors: Chinmay Apte, Santa Clara, CA (US); Brian Smith, Santa Clara, CA (US); Tezaswi Raja, Santa Clara, CA (US); Roman Surgutchik, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 281 days.

(21) Appl. No.: 16/051,315

(22) Filed: Jul. 31, 2018

(65) Prior Publication Data

US 2020/0043868 A1    Feb. 6, 2020

(51) Int. Cl.
| | | |
|---|---|---|
| *H01L 23/552* | (2006.01) | |
| *H01L 23/00* | (2006.01) | |
| *G06F 21/75* | (2013.01) | |
| *H02H 9/04* | (2006.01) | |
| *H01L 23/66* | (2006.01) | |
| *G06F 21/87* | (2013.01) | |

(52) U.S. Cl.
CPC ............ *H01L 23/552* (2013.01); *G06F 21/75* (2013.01); *H01L 23/576* (2013.01); *H02H 9/046* (2013.01); *G06F 21/87* (2013.01); *H01L 23/66* (2013.01); *H01L 2223/6677* (2013.01)

(58) Field of Classification Search
CPC ..... H01L 23/552; H01L 23/576; H01L 23/60; H01L 23/66; H01L 27/0248; H01L 2223/6677; G06F 21/75; G06F 21/755; G06F 21/87; H02H 3/22; H02H 9/04; H02H 9/046; H02H 5/005; H05K 1/0259
USPC .......................................................... 361/56
See application file for complete search history.

(56) References Cited

U.S. PATENT DOCUMENTS

| | | | |
|---|---|---|---|
| 2002/0130248 A1 | 9/2002 | Bretschneider et al. | |
| 2005/0170843 A1* | 8/2005 | Billhartz ............... | H04W 64/00 455/456.1 |

(Continued)

FOREIGN PATENT DOCUMENTS

| | | |
|---|---|---|
| CN | 106656460 A | 5/2017 |
| CN | 107942154 A | 4/2018 |

(Continued)

OTHER PUBLICATIONS

Yanci, et al.; "Detecting Voltage Glitch Attacks on Secure Devices"; Bio-inspired, Learning and Intelligent Systems for Security; IEEE Computer Society; DOI 10.1109/BLISS.2008.26; 2008; pp. 75-80.

(Continued)

*Primary Examiner* — Jue Zhang

(57) ABSTRACT

An on-chip electromagnetic (EM) pulse protection circuit detects EM pulse attacks, generates an alarm, and performs a defensive action to protect the integrated circuit. The EM pulse protection circuit can be used with various integrated circuits or manufactured chips in which, for example, there is a desire to keep information secure, maintain the security of the chip, secure boot processes, and/or protect private keys.

23 Claims, 3 Drawing Sheets

(56) References Cited

U.S. PATENT DOCUMENTS

| | | | |
|---|---|---|---|
| 2006/0183488 A1* | 8/2006 | Billhartz | H04W 24/00 |
| | | | 455/456.5 |
| 2007/0118286 A1* | 5/2007 | Wang | G01C 21/165 |
| | | | 342/357.59 |
| 2007/0285277 A1* | 12/2007 | Scott | G08B 13/2471 |
| | | | 340/870.26 |
| 2011/0001173 A1* | 1/2011 | Ojefors | H03F 1/22 |
| | | | 257/290 |
| 2012/0154971 A1 | 6/2012 | Brashear | |
| 2013/0281800 A1* | 10/2013 | Saroka | A61B 5/00 |
| | | | 600/301 |
| 2014/0050112 A1* | 2/2014 | Muniz Garcia | G01S 5/12 |
| | | | 370/252 |
| 2017/0131427 A1* | 5/2017 | Kirchmeier | E21B 10/00 |
| 2017/0220443 A1 | 8/2017 | Broutin et al. | |
| 2017/0373890 A1* | 12/2017 | Fertonani | H04B 1/1661 |
| 2018/0005964 A1 | 1/2018 | Ordas et al. | |
| 2018/0135408 A1* | 5/2018 | Cooley | E21B 47/13 |
| 2018/0331738 A1* | 11/2018 | Agrawal | H04B 7/0802 |
| 2019/0013281 A1* | 1/2019 | Elenes | H03G 3/20 |
| 2019/0320403 A1* | 10/2019 | Zhang | H04W 16/28 |

FOREIGN PATENT DOCUMENTS

| | | |
|---|---|---|
| DE | 19606851 A1 | 8/1997 |
| WO | 2017060594 A1 | 4/2017 |
| WO | 2018081883 A1 | 5/2018 |

OTHER PUBLICATIONS

Pereira, et al.; "EMP (Electro-Magnetic Pulse) Weapon Technology along with EMP Shielding & Detection Methodology"; IEEE 31661; 4th ICCCNT-2013; Jul. 4-6, 2013; pp. 1-5.

Baz, et al.; "A Fully-Digital EM Pulse Detector"; 2016 Design, Automation & Test in Europe Conference & Exhibition; EDAA; 978-3-9815370-7-9/DATE16; 2016; pp. 439-444.

* cited by examiner

PROTECTING CHIPS FROM ELECTROMAGNETIC PULSE ATTACKS USING AN ANTENNA

TECHNICAL FIELD

This application is directed, in general, to integrated circuits and, more specifically, to protecting integrated circuits from electromagnetic (EM) pulse attacks.

BACKGROUND

Hardware security is becoming a real concern in all product categories. Chips are being subject to security attacks using power, clock and EM pulses, to extract information from the chip. In an EM pulse attack on an integrated chip, attackers can use a probe with an inductor coil attached at the end of it and apply a very high voltage ramp for a very short duration of time. This creates electromagnetic pulses at the tip of the inductor coil. Chip package as well as metal routes (VDD/GND rails) on a chip have some inductance associated with them. When such a pulse is applied and directed to a chip via the probe, the applied pulse can produce glitches on the chip due to the mutual coupling between the probe coil and the on-chip inductance. The glitches can be caused even without the probe directly touching the chip and when the mutual coupling is small. The induced glitches can manifest into timing failure if the glitch is big enough or a clock glitch which can cause a unit to skip a cycle or corrupt data that allows attackers to extract secure information.

If an EM pulse attack is not successful at one location, attackers can keep sweeping the probe for target locations on the chip and/or increase the attack voltage to successfully break the chip. The attackers can use a robotic arm having an XYZ-positioning mechanism in order to target a particular location on the chip.

SUMMARY

In one aspect, an EM pulse protection circuit for an integrated circuit is disclosed. In one embodiment, the EM pulse protection circuit includes: (1) alarm circuitry configured to receive a detection signal and, in response thereof, generate an alarm signal that indicates detection of an EM pulse attack, and (2) detection circuitry including an antenna configured to generate the detection signal in response to the EM pulse attack on the integrated circuit.

In another aspect, an integrated circuit is disclosed. In one embodiment, the integrated circuit includes: (1) circuitry configured to perform a function, and (2) an EM pulse protection circuit having detection circuitry with an antenna that generates a detection signal in response to an EM pulse attack on the integrated circuit.

In yet another aspect, a method of protecting an integrated circuit from an EM pulse attack is disclosed. In one embodiment, the method includes: (1) detecting an induced voltage at two terminals of an on-chip antenna in response to an EM pulse attack voltage on the integrated circuit, (2) generating an alarm signal when the induced voltage exceeds a voltage threshold, and (3) performing a defensive action is response to the alarm signal.

BRIEF DESCRIPTION

Reference is now made to the following descriptions taken in conjunction with the accompanying drawings, in which.

DETAILED DESCRIPTION

The EM pulse attacks as discussed above are intended to break into a system of the chip during, for example, a boot or corrupt state to allow attackers to extract secure information. The secure information includes private keys and security keys. If the attackers, also referred to as hackers, can extract secure information such as the security keys, the hackers can then use the security keys to hack into all the chips of that particular type. Since chips are now being used in self driving car applications as well as console applications, this poses a serious threat in terms of user security and safety. Thus, the importance of protecting chips against EM pulse attacks has increased, especially for chips that contain or process secure information.

As such, this disclosure relates to detecting and responding to EM pulse attacks on integrated circuits. This disclosure provides an on-chip EM pulse protection circuit that detects EM pulse attacks, generates an alarm in response thereof, and performs a defensive action to protect the integrated circuit. On-chip as used herein indicates that the EM pulse protection circuit is integrated with the integrated circuit (in the silicon itself) or within a package or package layer of the integrated circuit. The EM pulse protection circuit can be an on-chip circuit that is positioned on an electronic package that includes the integrated circuit. The EM pulse protection circuit can be used with various integrated circuits or manufactured chips in which, for example, there is a desire to keep information secure, maintain the security of the chip, secure boot processes, and/or protect private keys.

Figure 1:
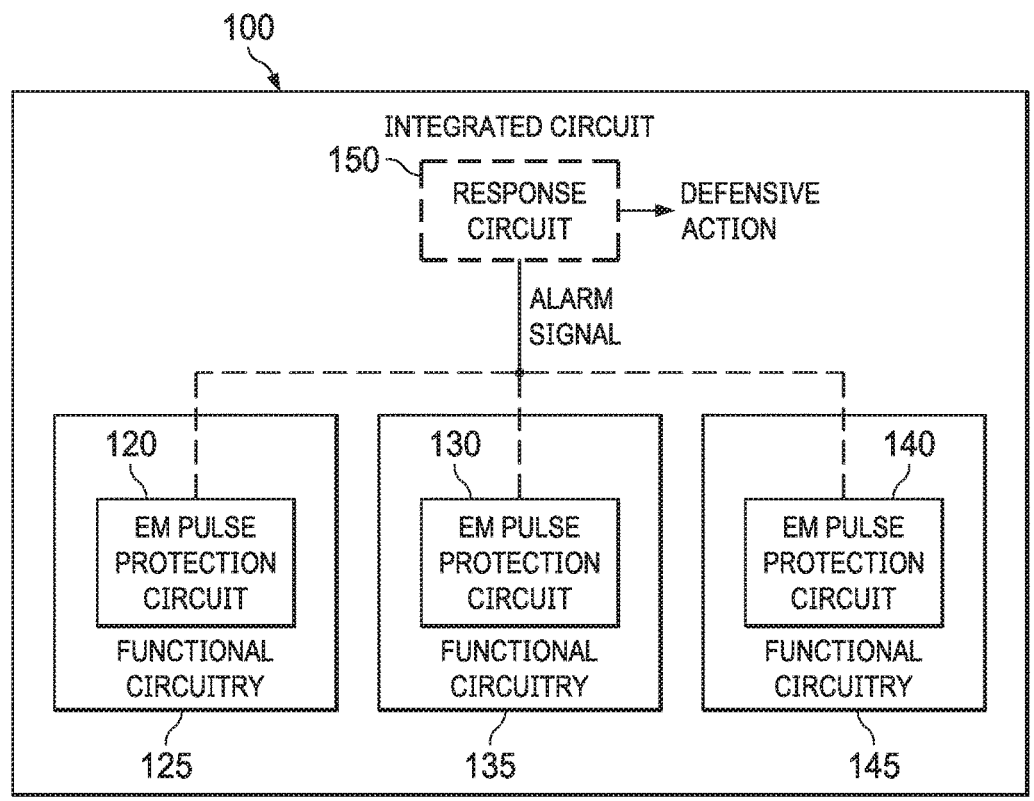
FIG. 1 illustrates a block diagram of an example of an integrated circuit having multiple EM pulse protection circuits constructed according to the principles of the disclosure.

The EM pulse protection circuit can be located on a level within the integrated circuit or die that is above, below, or at the same level as the circuitry to be protected. In one example, the EM pulse protection circuit can be located within the top two levels of a die. The EM pulse protection circuit can be integrated in different silicon levels of an integrated circuit. An integrated circuit can include multiple EM protections circuits that are each designated to protect a particular area or designated circuitry of the integrated circuit. As illustrated in FIG. 1, a single response circuit can be used for all of the EM pulse protection circuits.

Turning now to the figures, FIG. 1 illustrates a block diagram of an example of an integrated circuit 100 having multiple EM pulse protection circuits 120, 130, 140, constructed according to the principles of the disclosure. In addition to the EM pulse protection circuits 120, 130, 140, the integrated circuit 100 includes functional circuitry 125, 135, 145. The functional circuitry 125, 135, 145 is functional or logic circuitry configured to perform a particular function. The functional circuitry 125, 135, 145, may be any circuitry that can be integrated onto a common substrate either now or in the future. For example, the functional circuitry can include hybrid (analog/digital) circuitry and input/output (I/O) circuitry.

Each of the EM pulse protection circuits 120, 130, 140, is designated to detect an EM pulse attack at particular locations on the integrated circuit 100. As illustrated, each of the EM pulse protection circuits 120, 130, 140, corresponds to a particular one of the functional circuitries 125, 135, 145, in their designated area to protect. The EM pulse protection circuits 120, 130, 140, can be integrated in a silicon layer above the functional circuitries 125, 135, 145, designated to protect. The EM pulse protection circuits 120, 130, 140, can include their own dedicated response circuit that performs a defensive action in response to a detected EM pulse attack. In FIG. 1, as indicated by the dashed lines, a single response circuit 150 can be used to perform a defensive action for multiple EM pulse protection circuits, such as EM pulse protection circuits 120, 130, 140 in FIG. 1.

Figure 2:
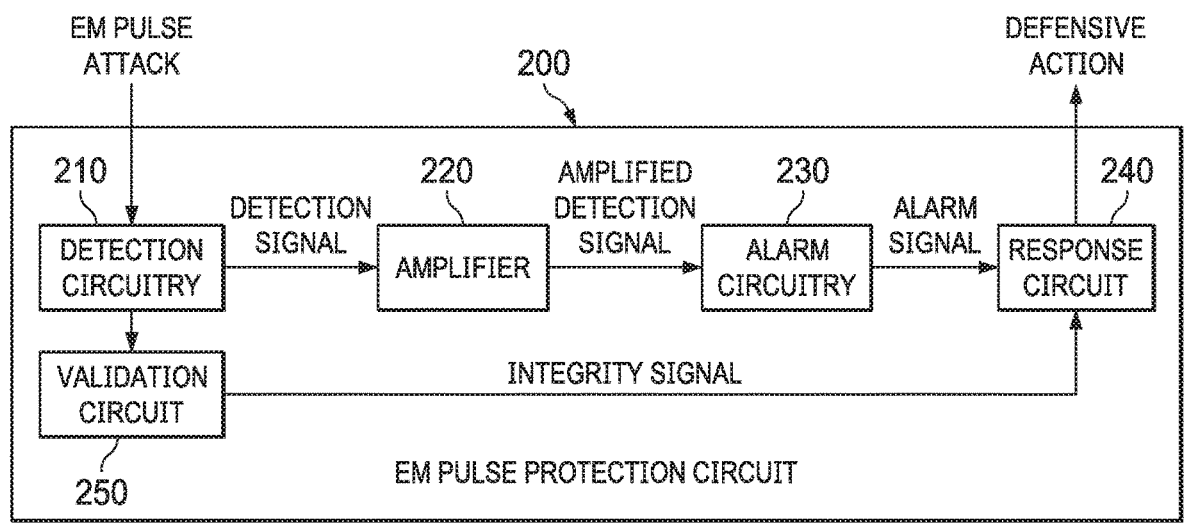
FIG. 2 illustrates a block diagram of an example of an EM pulse protection circuit constructed according to the principles of the disclosure.

FIG. 2 illustrates a block diagram of an example of an EM pulse protection circuit 200 constructed according to the principles of the disclosure. The EM pulse protection circuit 200 includes detection circuitry 210, an amplifier 220, alarm circuitry 230, a response circuit 240, and a validation circuit 250.

The detection circuitry 210 is configured to generate a detection signal in response to an EM pulse attack on an integrated circuit that includes the EM pulse protection circuit 200. The detection signal can be an analog signal. The detection circuity 210 detects an EM pulse attack via a voltage that is induced from the EM pulse. The detection circuitry 210 can include an inductor with a grounded center tap that receives the induced voltage from the EM pulse. The detection circuitry 210 can be an on-chip circuit and the inductor can be an antenna. The antenna can be shifted in a direction where an EM attack is the most probable to come from for detection.

The detection circuitry 210 does not have to physically cover an area of a chip or integrated circuit to protect circuits within the area. Instead, the coverage area of protection by the detection circuitry 210 can be larger than a footprint of the detection circuitry 210 in the same way that an antenna can pick up a remote signal. The coverage area of protection of the detection circuitry 210 can vary depending on such factors as the physical parameters of the antenna, the frequency, and the magnitude of the EMP pulse. The detection circuitry 210 can be located to protect particular areas of an integrated circuit, such as circuitry that stores or processes secure information. As such, some areas of an integrated circuit can be left unprotected from detecting EM pulse attacks by the detection circuitry 210. The intelligent and directed placement of the detection circuitry 210, and the EM pulse protection circuit 200 as a whole, can reduce complexity and cost of a chip but yet still protect needed areas, e.g., secure areas, of the chip.

The type and physical size of the antenna can vary depending on the application and the available space on a chip. Different types of antennas include planar antennas that are square, hexagonal, octagonal, and circular. Large sized antennas can be used when space is available. With sufficiently sized antennas, amplification of the detection signal may not be needed. An example of a large antenna is one having an area of 120 µm by 120 µm. An example of a small antenna is one having an area of 35 µm by 35 µm. A trade-off between antenna size and the need for amplification exists and can be determined based on factors such as specific designs, available die space, desired coverage areas, etc.

The amplifier 220 is configured to receive and amplify the detection signal, and provide the amplified detection signal to the alarm circuitry 230 to generate an alarm signal. As noted above, the amplifier 220 is not needed in some embodiments in which the detection signal is sufficient to generate the alarm signal. The amplifier 220 can be a conventional amplifier.

The alarm circuitry 230 is configured to receive the detection signal and, in response thereof, generate the alarm signal that indicates detection of the EM pulse attack. The received detection signal can be an amplified detection signal as illustrated in FIG. 2. The alarm circuitry 230 generates the alarm signal when the induced voltage, represented by the detection signal, exceeds a voltage threshold. The alarm circuitry 230 can include an analog comparator configured to compare the detection signal to the voltage threshold. The voltage threshold is selected based on, at least, an EM pulse attack voltage or range thereof to detect. The threshold can vary depending on the application, implementation, or design of the EM pulse protection circuit 200. The alarm signal can be a digital alarm signal.

The response circuit 240 is configured to receive the alarm signal and perform a defensive action in response. The response circuit 240 can be a processor or part of a processor that is programed to perform one or multiple defensive actions in response to an alarm signal. The defensive actions can include disabling the integrated circuit, resetting the integrated circuit, altering data stored on the integrated circuit, hiding data that is on the integrated circuit, tracking the EM pulse attack, providing misleading or incorrect data, and other defensive actions to protect secure information. In one example, a counter can be used to count the number of attacks and disable the chip after a determined number of attacks.

The validation circuit 250 is configured to validate the integrity of the detection circuitry 210 to insure the detection circuitry 210 has not been damaged to foil detection of an EM pulse attack. The validation circuit 250 can be an additional circuit that is employed is some embodiments. The validation circuit 250 can be, for example, a passive circuit that provides self-validation of the antenna of the detection circuitry 210. In one embodiment, the validation circuit 250 can validate the integrity of the antenna by checking latency of a signal propagating through the antenna. The validation circuit 250 can send a signal from one terminal of the antenna to the other terminal of the antenna and compare the propagating time to a known standard to insure the antenna has not been damaged. Since the validation circuit 250 is connected across the terminals of the antenna of the detection circuitry 210 for the signal to be sent through the antenna, the signal is selected to not violate the voltage threshold of the alarm circuitry 230 or to run validation in periods before detection is enabled or during periods when detection can be paused. The signal can be periodic pulses. Conventional electrical components can be used to compare the standard and testing propagation times to determine the integrity of the antenna. If integrity of the antenna fails, the validation circuit 250 is configured to generate an integrity signal that is reported to the response circuit 240. Defensive actions can then be taken just as if an alarm signal was received.

Figure 3:
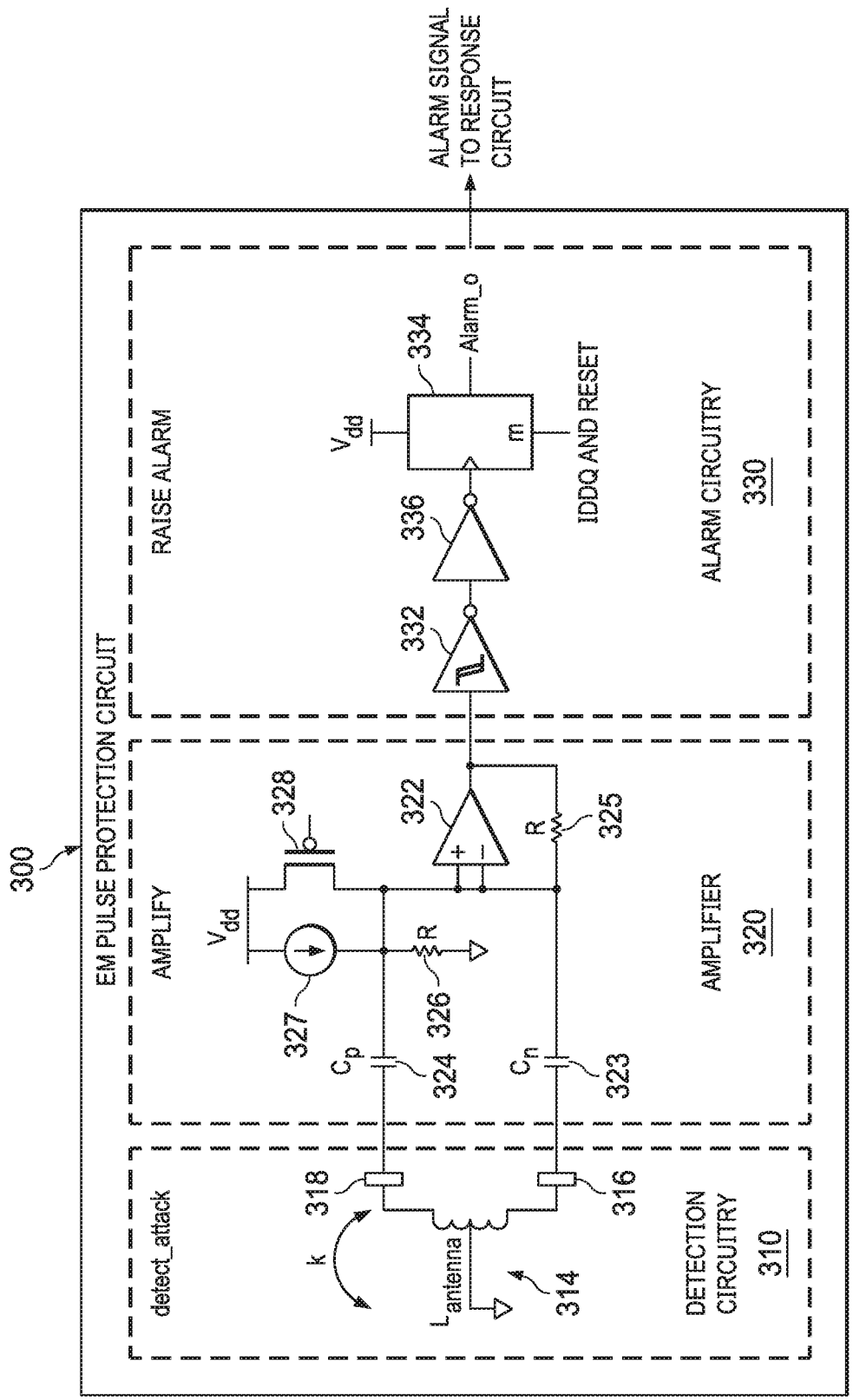
FIG. 3 illustrates a schematic diagram of an example of an EM pulse protection circuit constructed according to the principles of the disclosure.

FIG. 3 illustrates a schematic diagram of an example of an EM pulse protection circuit 300 constructed according to the principles of the disclosure. The example EM pulse protection circuit 300 includes detection circuitry 310, an amplifier 320, and alarm circuitry 330. The detection circuitry 310, the amplifier 320, and the alarm circuitry 330, or at least one of the three, such as the detection circuitry 310, can be integrated with an integrated circuit to provide on-chip protection for the integrated circuit. Values for the different components of the EM pulse protection circuit 300 are provided below as examples. One skilled in the art will understand the values can vary depending on the implementations and the desired range of EM pulses to detect.

The detection circuitry 310 includes a center tapped inductor that is used as an antenna and denoted as antenna 314. The antenna 314 can be on-chip which increases the difficulty to disable. The physical size of the antenna 314 can vary depending on such factors as the particular implementation, available die space, amplification needs, etc. The antenna 314 is a center tapped 445 pH antenna.

When an EM pulse attack is targeted at the antenna 314, because of the mutual coupling (k) between the antenna 314 and the attack probe coil, a differential electromagnetic field is induced at the two terminals 316, 318, of the antenna 314. (The terminals 316, 318, are an example of where a validation circuit, such as validation circuit 250, can be coupled.) The induced differential voltage depends on the attack voltage, k factor (coupling), attack voltage slew rate, and the inductance value of the probe coil and the on-chip antenna 314. The induced voltage at the terminals 316, 318, of the antenna 314 can be of the order of +/− tens of mV.

The EM pulse protection circuit 300 converts the induced voltage at the terminals 316, 318, into a digital signal. In the illustrated example, an amplifier 320 is needed for the conversion. Since the antenna 314 produces a differential voltage, a differential operational amplifier 322 can be used to amplify the signal. Typical gain for the differential operational amplifier 322 can be 20–30 dB. The amplifier 320 is used in a differential to single ended configuration and the output of the differential operational amplifier 322 is connected to the input of a digital comparator 332 of the alarm circuitry 330. In the illustrated embodiment, the digital comparator 332 is a Schmitt trigger and will be referred to hereinafter as Schmitt trigger 332. In some applications that receive the detection signal without amplification, an analog comparator can be used.

The amplifier 320 also includes capacitors 323, 324, and resistors 325, 326. In this example, the capacitors 323, 324, have a value of 4 pF and the resistors 325, 326, have a value of 40 ohms. The amplifier 320 also includes a current source 327 and a switch 328 that are both coupled to the operating voltage $V_{dd}$. The current source 327 provides a current bias of 20 μA and the switch 328 controls reset of the differential operational amplifier 322. The operating voltage $V_{dd}$ is one volt. The values are provided as an example of an implementation. Different circuit, usage, and process choices can change these values.

When the amplified detection signal crosses the Schmitt threshold, the output of the Schmitt trigger 332 changes state. The change in output is used to produce a "clock edge" to sample and hold, for example, a "1" at the output of a logic gate, flop 334. This output or alarm signal generated by the alarm circuitry 330 depicts that an EM pulse attack has been successfully detected. The alarm circuitry 330 can provide the alarm signal to a response circuit, such as response circuit 150 or response circuit 240, to take appropriate defensive actions.

The output of the Schmitt trigger 332 is provided to an inverter 336 before being supplied to the clock input of the flop 334. In other embodiments, different circuitry or components can be employed to provide an alarm signal. For example, synchronous sampling, set/reset flops, latches, etc. can be used. In some implementations where the detection signal is sufficiently large, such as to drive a flop, a comparator such as the Schmitt trigger 332 is not needed, and the detection signal can be provided to the inverter 336 and then the flop 334. Since the EM pulse attacks can have short duration, the flop 334 is used to hold a value once an attack is detected to allow for performing secure measures, i.e., defensive actions.

Figure 4:
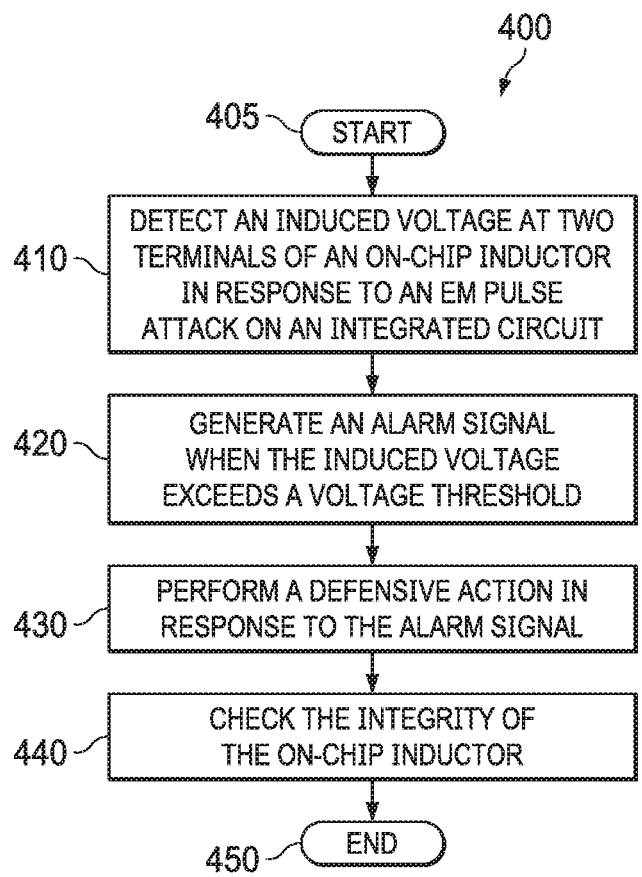
FIG. 4 illustrates a flow diagram of an example of a method of protecting an integrated circuit from an EM pulse attack, the method carried out according to the principles of the disclosure.

FIG. 4 illustrates a flow diagram of an example of a method 400 of protecting an integrated circuit from an EM pulse attack, carried out according to the principles of the disclosure. The method 400 begins in a step 405.

In a step 410, an induced voltage is detected at two terminals of an inductor in response to an EM pulse attack voltage on the integrated circuit. The inductor can be an on-chip antenna. The antenna can be a center-tapped antenna. The induced voltage can be a detection signal.

In a step 420, an alarm signal is generated when the induced voltage exceeds a voltage threshold. The voltage threshold is selected based on an EM pulse attack voltage or range thereof to detect. A comparator can be used to compare the induced voltage to the voltage threshold. In some applications, the induced voltage can be amplified before the comparison.

In a step 430, a defensive action is performed in response to the alarm signal. Multiple different types of defensive actions can be performed, and more than one type of defensive action can be performed in response to a single alarm signal. A response circuit can be used to perform or initiate the defensive action or actions.

In a step 440, the integrity of the on-chip inductor is checked. The integrity of the on-chip inductor, or antenna as noted above, can be a self-validating check that checks latency from one terminal to the second terminal. A periodic pulse can be applied to measure the latency between the terminals. A validation circuit can be employed to check the integrity of the antenna and provide an output to the EM pulse protection circuit to indicate that the on-chip antenna has not been compromised. This will insure that an alarm signal is truly an alarm indicating an EM pulse attack. The method 400 ends in a step 450.

This disclosure describes test structures that can be implemented in, for example, silicon to raise an alarm whenever an EM pulse attack occurs. The goal of these test structures referred to herein as an EM pulse protection circuit, is to successfully detect a hardware attack of such a kind and raise an alarm after successfully detecting the attack. An additional goal can also be to perform a defensive action in response to the alarm that is raised. The EM pulse protection circuit can be a passive circuit that is activated by induction from an EM pulse attack.

Those skilled in the art to which this application relates will appreciate that other and further additions, deletions, substitutions and modifications may be made to the described embodiments.

What is claimed is:

1. An electromagnetic (EM) pulse protection circuit for an integrated circuit, comprising:
   alarm circuitry configured to receive a detection signal and, in response thereof, generate an alarm signal that indicates detection of an EM pulse attack;
   detection circuitry including an antenna configured to generate the detection signal in response to the EM pulse attack on the integrated circuit, wherein the detection signal is a differential voltage induced at two terminals of the antenna, and wherein the EM pulse protection circuit is located on-chip with the integrated circuit; and validation circuitry configured to validate integrity of the antenna by checking latency of a signal propagating through the antenna, wherein the latency of the signal propagating through the antenna is determined by sending a signal from one terminal of the antenna to another terminal of the antenna and comparing a time the signal propagates from the one terminal of the antenna to the other terminal of the antenna with a known standard.

2. The EM pulse protection circuit as recited in claim 1 further comprising an amplifier configured to receive and amplify the detection signal, and provide the amplified detection signal to the alarm circuitry to generate the alarm signal.

3. The EM pulse protection circuit as recited in claim 1 wherein the differential voltage induced is due to mutual coupling (k) between the antenna and an attack probe coil used for the EM pulse attack.

4. The EM pulse protection circuit as recited in claim 1 wherein the antenna is an on-chip, center-tapped antenna.

5. The EM pulse protection circuit as recited in claim 1 wherein the antenna is a planar antenna integrated on the integrated circuit.

6. The EM pulse protection circuit as recited in claim 1 wherein the detection signal is an analog signal and the alarm circuitry converts the detection signal to a digital alarm signal.

7. The EM pulse protection circuit as recited in claim 6 wherein the alarm circuitry includes a comparator that receives and processes the detection signal, and provides an output to a logic gate to generate the digital alarm signal.

8. The EM pulse protection circuit as recited in claim 7 wherein the comparator is a Schmitt trigger that produces a clock edge for the logic gate to generate the digital alarm signal.

9. The EM pulse protection circuit as recited in claim 8 further comprising an op amp configured to receive and amplify the detection signal, and provide the amplified detection signal to the Schmitt trigger.

10. The EM pulse protection circuit as recited in claim 1 wherein the EM pulse protection circuit is an on-chip circuit that is integrated in a silicon level of the integrated circuit.

11. The EM pulse protection circuit as recited in claim 1 wherein the EM pulse protection circuit is an on-chip circuit that is positioned on an electronic package including the integrated circuit.

12. The EM pulse protection circuit as recited in claim 1 further comprising a response circuit configured to receive the alarm signal and perform a defensive action in response.

13. The EM pulse protection circuit as recited in claim 12 wherein the defensive action is one or more items selected from the list consisting of:
 disable the integrated circuit,
 reset the integrated circuit,
 alter data stored on the integrated circuit,
 hide data that is on the integrated circuit,
 track the EM pulse attack, and
 provide incorrect data.

14. An integrated circuit, comprising:
 circuitry configured to perform a function; and
 an electromagnetic (EM) pulse protection circuit having validation circuitry and detection circuitry with an antenna that generates a detection signal in response to an EM pulse attack on the integrated circuit, wherein the detection signal is a differential voltage induced at two terminals of the antenna, wherein the EM pulse protection circuit is located on-chip with the integrated circuit, wherein the validation circuitry is configured to validate integrity of the antenna by checking latency of a signal propagating through the antenna, and wherein the latency of the signal propagating through the antenna is determined by sending a signal from one terminal of the antenna to another terminal of the antenna and comparing a time the signal propagates from the one terminal of the antenna to the other terminal of the antenna with a known standard.

15. The integrated circuit as recited in claim 14 wherein the differential voltage is due to mutual coupling (k) between the antenna and an attack probe coil used for the EM pulse attack.

16. The integrated circuit as recited in claim 14 wherein the antenna is an on-chip, center-tapped antenna.

17. The integrated circuit as recited in claim 14 wherein the antenna is a planar antenna integrated on the integrated circuit.

18. The integrated circuit as recited in claim 14 wherein the EM pulse protection circuit further includes alarm circuitry that receives the detection signal and generates an alarm signal that indicates detection of the EM pulse attack.

19. The integrated circuit as recited in claim 18 further comprising a response circuit configured to receive the alarm signal and perform a defensive action in response.

20. The integrated circuit as recited in claim 19 further comprising multiple EM pulse protection circuits distributed across the integrated circuit.

21. A method of protecting an integrated circuit from an electromagnetic (EM) pulse attack, comprising:
 detecting, via an on-chip circuit, an induced voltage at two terminals of an on-chip antenna in response to an EM pulse attack voltage on the integrated circuit;
 generating an alarm signal when the induced voltage exceeds a voltage threshold;
 performing a defensive action is response to the alarm signal; and
 validating integrity of the antenna by checking latency of a signal propagating through the antenna, wherein the latency of the signal propagating through the antenna is determined by sending a signal from one terminal of the antenna to another terminal of the antenna and comparing a time the signal propagates from the one terminal of the antenna to the other terminal of the antenna with a known standard.

22. The method as recited in claim 21 wherein the on-chip antenna is integrated in a silicon level of the integrated circuit.

23. The method as recited in claim 21 wherein a value of the voltage threshold is selected for the EM pulse attack voltage.

* * * * *